May 4, 1937.  H. SMITH  2,079,232
CONVERTIBLE AUTOMOBILE BODY
Filed July 22, 1935  5 Sheets-Sheet 1

INVENTOR,
Hinsdale Smith,
BY
Walter C. Ross
ATTORNEY.

Patented May 4, 1937

2,079,232

UNITED STATES PATENT OFFICE 2,079,232

CONVERTIBLE AUTOMOBILE BODY

Hinsdale Smith, Springfield, Mass.

Application July 22, 1935, Serial No. 32,498

17 Claims. (Cl. 296—116)

This invention relates to improvements in automobiles and is directed more particularly to improvements in automobile body and top construction.

The principal objects of the invention are directed to the provision of a convertible top construction for an automobile which according to novel features of construction and arrangement facilitates the ready and easy converting of the automobile from an open to closed type and vice versa.

According to one special feature of the invention, the novel top construction is characterized by its simplicity in form and efficiency in operation, thus making it possible for a single person with a minimum of effort to easily and quickly manipulate the top between extended and collapsed position.

According to another special feature of the invention, the frame construction of the novel top is so constructed and arranged that its operation and/or manipulation is not affected by varying conditions of the covering material, thus obviating the difficulties of manipulation and the objections common with present day tops as where the top material shrinks to make it difficult to secure the forward end of the top construction to the automobile.

According to further novel features of the invention, the frame is box-like in form at its forward end so as to stiffen the structure. This facilitates easy and ready manipulation of the top and provides a strong rigid structure.

According to a still further feature of the invention, the top structure is characterized by a novel arrangement of relatively movable frame forming parts which when in collapsed relation are nested compactly so as to occupy but small space while means is provided to facilitate ready movement of the parts as well as to support and releasably hold them in collapsed and extended positions.

Many and various other novel features and advantages of the invention will be hereinafter referred to and pointed out in the appended claims, the preferred form of the invention being described in the following specification and reference being had to the accompanying drawings, wherein:

Referring now to the drawings more in detail, the inventions will be fully described.

Figures 1, 2, 3, 4, 5:
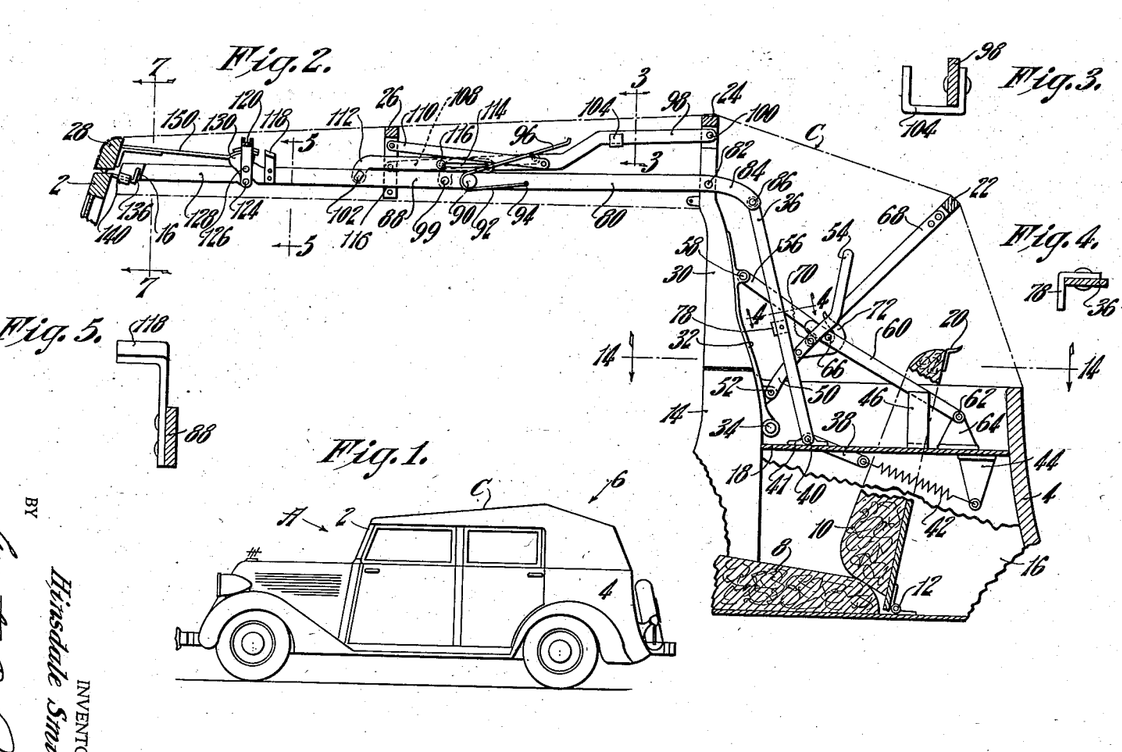
Fig. 1 is a small scale side elevational view of an automobile having the top construction of the invention associated therewith.
Fig. 2 is a longitudinal sectional view through the top construction of the automobile shown in Fig. 1 with so much of the automobile associated therewith as is necessary to explain the invention.
Fig. 3 is a vertical sectional view on the line 3—3 of Fig. 2.
Fig. 4 is a plan sectional view on the line 4—4 of Fig. 2.
Fig. 5 is a vertical sectional view on the line 5—5 of Fig. 2.

In Fig. 1 an automobile is shown at A which for purposes of disclosure is of the collapsible sedan type. The windshield, which serves as a support for the forward end of the top structure, is represented at 2, the tonneau at 4 and the top including the novel features of the invention is represented generally by 6.

According to this invention, the top 6, which includes a covering C of some suitable material, is supported by a novel frame. This consists in a general way of a plurality of members which as will be explained are arranged to move relative to one another so that the frame may be disposed in an extended position where the top extends from the tonneau 4 to the windshield or a collapsed position where the top is disposed at the rear end of the automobile, the said frame members being connected together and arranged to make it possible to quickly and readily convert the automobile from closed to open type, and vice-versa.

In the drawings the frame forming members at one side of the automobile only are shown, as in Figs. 2, 6, 8 and 12. It will be understood that there are duplicate sets of members at either side of the automobile some of which are connected to transverse bows and the like so that a complete frame structure is provided. In operation the members at opposite sides of the automobile are moved simultaneously so that the frame or top may be moved between collapsed and extended positions.

A more detailed description will now follow with reference to the various figures of the drawings.

As shown in Fig. 2, the rear seat of the automobile is represented by 8 and the back cushion by 10, the said cushion being hinged as at 12 for swinging movements forward and back.

Figure 12:
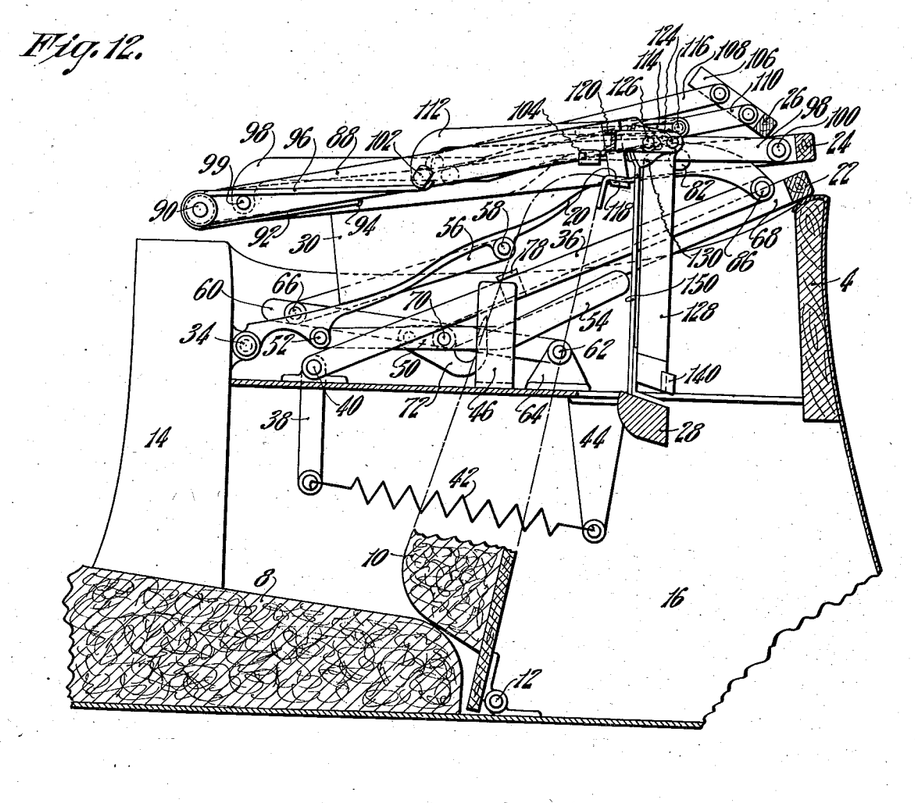
Fig. 12 is a longitudinal sectional elevational view through the rear part of the automobile and showing the frame members of the top in a collapsed relation.

There are side posts 14 as shown more particularly in Figs. 2 and 12 and interior trim members 16 are at opposite ends of the seat 8 and rearwardly of the door opening which is usual in automobile body construction. Shelves or supports 18 just rearwardly of the posts 14 serve as supports for various parts as will be seen in Figs. 2, 6, 8 and 14.

Locking hooks 20 are provided adjacent opposite ends at the upper side of the back cushion 10. These are arranged when the cushion 10 is in its rear position as shown in Fig. 12 for engagement with parts of the frame structure to hold the same in collapsed relation. The cushion 10 being hinged as described may be moved forwardly to release the frame structure and rearwardly to coact with and lock the frame in collapsed position.

In the form of the invention shown, there is a back bow member 22, a main bow member 24, a middle bow member 26 and a front bow or header member 28. All of these extend transversely, all preferably more or less curved, and have their opposite ends connected to certain parts of the frame at either side of the automobile so that they co-operate with the other members to form a frame structure for supporting the top covering.

The top covering represented by C will be of some flexible material and extends from the front bow or header member 28 rearwardly. It is supported by the bow members 26, 24 and 22, and is secured in some convenient manner to the tonneau or that part of the body at the rear of the automobile around the rear seat as well as to member 28. The top material is shown by dot-dash lines for clearness and as stated some or all of the bow members 22, 24 and 26 may be curved more or less, as may be desired.

Pillars 30 are fixed to brackets 32 which are hinged at their lower ends as at 34 to the posts 14 adjacent the ends of the rear seat 8. The bow member 24 which, as explained, extends transversely has its opposite ends secured to the pillars 30.

It will be understood that those parts of the frame at one side only of the automobile will be described since the parts at the other side are duplicates, the bow members and certain other parts being connected to certain parts of the frame at both sides of the automobile.

A link 36 rearwardly of the pillar 30 is rigidly associated with an extension arm 38 on a member rotatable in a bracket 41 so that members 36 and 38 swing simultaneously. A spring 42 preferably under more or less tension when the frame parts are in collapsed relation has one end fixed to the end of the member 38 while its other end is fixed to a bracket 44. Stops 46 are carried by the shelves 18 to coact with stops 78 on member 36 to limit the lowermost position of the frame parts when they are in the collapsed relation shown in Fig. 12.

Figures 8, 9, 10, 11:
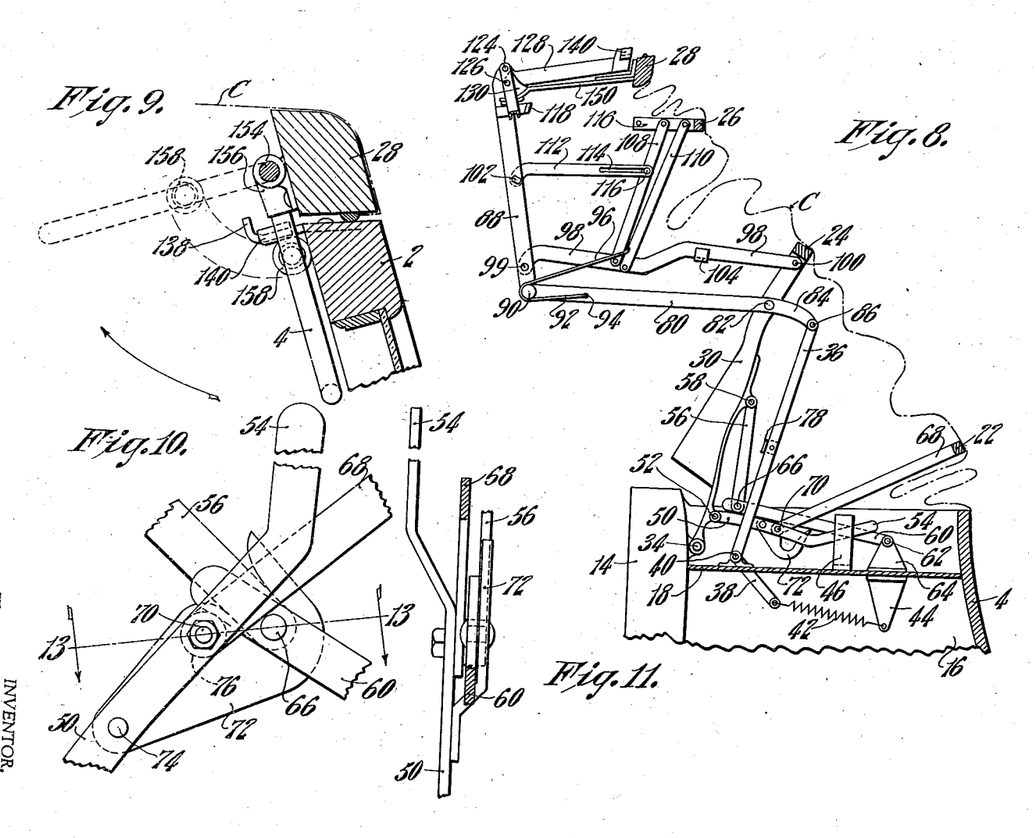
Fig. 8 is a longitudinal sectional elevational view similar to Figs. 2 and 6 showing the parts in another relative position.
Fig. 9 is a sectional elevational view on the line 9—9 of Fig. 7.
Fig. 10 is a side elevational view of certain parts of the frame structure at an enlarged scale to show novel details of construction.
Fig. 11 is an end elevational view of the parts shown in Fig. 10.
Figures 13, 14, 15, 16, 17:
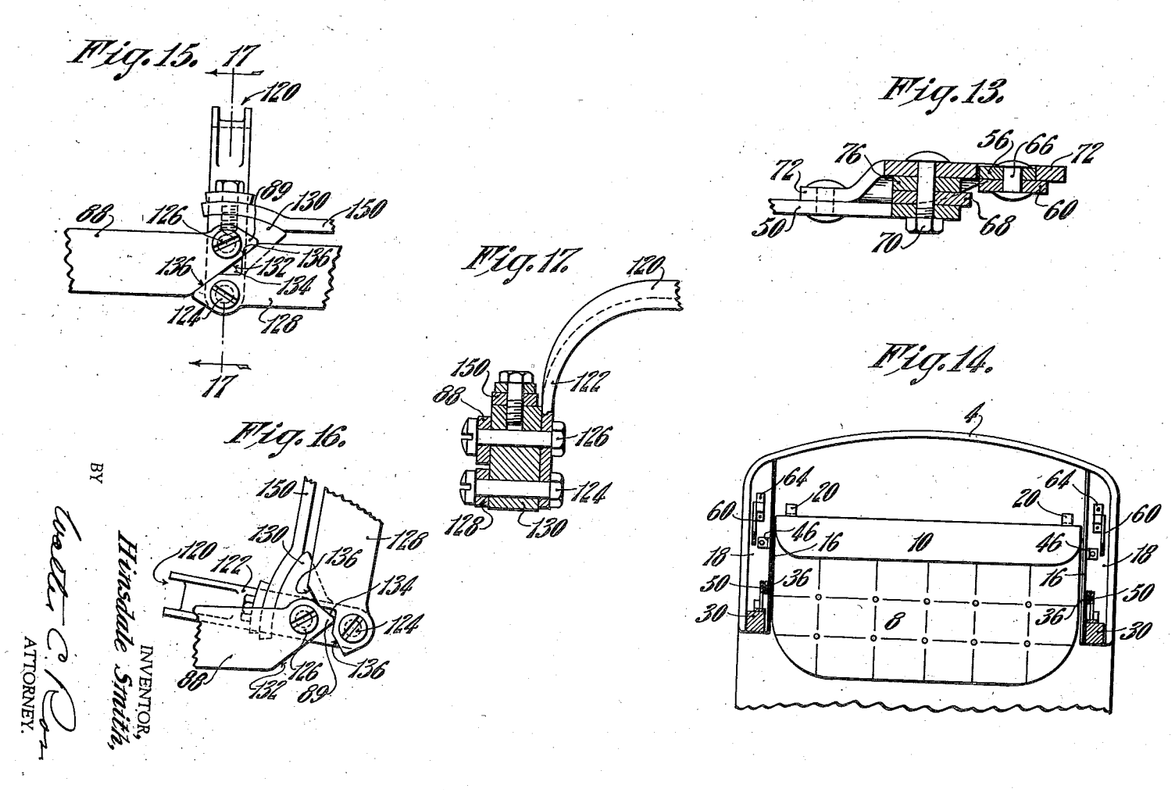
Fig. 13 is a sectional plan view on the line 13—13 of Fig. 10.
Fig. 14 is a plan view of the rear part of the automobile and taken on the line 14—14 of Fig. 2 to explain certain details of construction.
Figs. 15 and 16 are fragmentary side elevational views of the frame joint construction adjacent the forward end of the frame.
Fig. 17 is a vertical sectional view on the line 17—17 of Fig. 15.

A link 50 is pivoted at 52 to the bracket 32 of post 14 and has on its upper end a forwardly extending offset portion 54, which serves as a handle for operating a certain locking mechanism shown clearly in Figs. 10, 11 and 13. A link 56 is pivoted at 58 to pillar bracket 32 and a link 60 is pivoted at 62 to a bracket 64. The inner ends of these links 56 and 60 are pivoted together at 66. A bow arm 68 has its upper end fixed to the member bow 22, and its lower end is journalled on a bolt 70, associated with the member 50. The parts 50 and 68 at both sides of the automobile and the bow member 22 form a complete bow.

A cam-like member 72 is fixed to the member 50 by a rivet or pin 74 and the bolt 70 and a roller 76 disposed between the members 50 and 72 is journalled on said bolt 70. The inner end of link 60 rides on this roller 76.

The cam member is provided with a throat (as shown in Fig. 10) for receiving the inner end of link 56 when the frame parts are in extended position as shown in Figs. 2 and 10. The parts shown in Fig. 10 are what may be called in locked position when the rearmost parts of the frame are in extended position. That is, the inner ends of members 50 and 68 being pivoted together as they are, and the members 56 and 60 being so pivoted with the end of member 56 in the throat of cam 72 and the end of member 60 on roller 76 the parts are locked against accidental relative movement and thereby rigidly support the parts connected to them.

When it is desired to collapse the frame the part 54 is moved rearwardly or to the right or left, as shown in Fig. 10. This swings the cam 72 clockwise disengaging end of member 56 from its throat so that these parts 50, 56, 60 and 68 may move relative to one another into collapsed position.

A bracket link 98 pivoted at 100 to the main bow 24 is offset, as shown, and has its forward end pivoted at 99 to member 88. A support 104 extends from and is fixed to the link 98 (see Figs. 2 and 3) for receiving and supporting certain of the parts when the frame is in collapsed relation.

The bow 26 may have on opposite ends side parts such as 106 (see Fig. 8). Links 108 and 110 are pivoted at opposite ends to the part 106 and the link 98. A bar 112 is pivoted at one end to a stud 102 projecting from bar 88 and a slot 114 thereof receives a pin 116 of the link 108. The stud 102 extends inwardly from bar 88 to engage with the free end 96 of spring 92, as will later appear. The members 108, 110, 112 and their connections with one another and bars and link 80, 88, and 98, allow the bow member 26 to move away from bar 88 from the position in Fig. 2 to that in Fig. 8 so that forward bow 28 may swing downwardly from the position shown in Fig. 8 past bow member 26.

A lock member 118 (see Figs. 2 and 5) is associated with the bar 88 for co-operating with the lock 20 associated with the seat cushion 10 when the parts are in collapsed position.

A cross member 120 more or less in the form of a bow and in fact which, if desired, may function as a bow, is provided primarily for use as an operating member for manipulating the frame structure. This has an end part 122 which is pivoted at 126 to the forward end of bar 88 and at 124 to the rear or inner end of a forward bar 128. (See Figs. 15 and 16. These figures are elevational views taken at the opposite or outer side of the parts as shown in Fig. 2.)

The pivots 124 and 126 are associated with a block member 130. The forward end of bar 88 has an inclined surface 132 while the end of member 128 is provided with a notch 134 and inclined surfaces 136 at either side thereof which are adapted to abut the surface 132. In Fig. 15 the parts are shown as they appear when the frame is in extended relation. In Fig. 16 the parts are shown as the frame is first moved to collapsed position. The block 130 and member 122 swing on pivot 126 simultaneously and relative to the bar 88. The bar 128 swings on pivot 124. The pivot 124 is swung relative to pivot 126 by swinging the block 130 and part 122 on pivot 126.

The end of member 128 being notched as at 134 allows swinging movements of the block 130 and member 128 between the positions shown in Figs. 15 and 16 because the said notch 134 receives the end or nose 89 of bar 88 as shown in Fig. 16.

The construction described provides what may be called a toggle joint. This is desirable in positioning the parts in their extended position. For the purpose of clearness, it will be explained that when the top has been moved to the position shown in Fig. 6, where the part 128 extends more or less upwardly, the pivot 124 is then somewhat forwardly of the pivot 126. Then member 128 may be swung downwardly so that certain locking or engaging means associated therewith is positioned somewhat forwardly or beyond the coacting locking means on the windshield.

With the locking means thus positioned, member 120 and block 130 are swung to move pivot 124 rearwardly or to position it below pivot 126. This engages the locking means. The structure provides a means of positioning the locking means on the forward end of the frame beyond the coacting locking means on the windshield and then retracting the end of the frame to insure a secure locking of the said locking means.

The locking means referred to will now be described with particular reference to Figs. 2, 6 and 7.

Brackets or hooks 136 are associated with the windshield at its upper corners which have upwardly extending flanges 138. The bar member 128 at either side of the automobile has on its forward end a hook 140 arranged to rest on the brackets 136 and lie behind and bring up against the parts 138 thereof. When members 128 swing downwardly so that hook 140 rests on hook 136 the hook is forwardly of flange 138. As pivot 124 is swung rearwardly, hook 140 brings up against the flange 138 to securely lock the forward end of the frame to the windshield.

A bar 150 is fixed to block 130 and is secured at its forward end to front header or bow member 28. The said bars 150, header 28 and block move together when the block is moved by member 120 to move the position of pivot 124 relative to pivot 126.

The top covering material C is preferably secured to and extends from bow member 28 to the rear part of the body as has been described and this is likely to shrink. By providing the toggle joint described the parts 128 may be positioned for locking to the windshield without regard to the condition of the covering material. When so positioned, the member 120 may be operated to swing the front bow 28 into position and engage the locking means.

It will be noted that the members 150 at opposite sides of the frame structure connected as they are to blocks 130 which are connected to bars 88 together with the member 120 and forward header 28 arranged transversely and connected to blocks 130 and members 150 form a box-like frame which swings on the ends of bars 88. This box-like frame not only serves to reinforce the forward end of the frame structure and obviate side sway, vibration and noise, but function as the means for securing the extended frame to the windshield.

Means for locking the forward bow or header 28 to the windshield will now be described with particular reference to Figs. 7 and 9.

A rotatable member 154 is journalled in bearings 156 and 160 associated with the header bar 28 and has offset end portions 157 carrying rollers 158. A handle H is fixed to the member 154 as shown. The parts are so arranged that the rollers 158 may be swung beneath and in engagement with the locks 138 to pull the front header 28 downwardly into place and releasably lock the same to the windshield.

In Fig. 2 the parts are shown when the frame structure is in extended relation with the top covering material properly tensioned and extending rearwardly from the front header bow 28 over the other bows 26, 24 and 22 to the tonneau.

The operation of the parts to collapse the structure will now be described.

All the parts are in their locked position in Fig. 2. To move the frame parts to a collapsed position, the handle H is swung away from the windshield to move the parts 158 from beneath the parts 138. The operating member 120 is swung clockwise to move pivots 124 forwardly of pivots 126 releasing locking parts 140 and 126 and releasing the box-like frame at the forward end of frame structure from the windshield. The member 120 is swung to position header 28 as shown approximately in Fig. 6. The handles 54 of members 50 at the rear portion of the frame structure are also moved clockwise to break the joints and permit relative movements of members 50, 68, 56 and 60. This movement of handles 54 releases the end of link 56 from the throat of cam 72 so pivot 66 may move forwardly and pivot 70 downwardly.

Figures 6, 7:
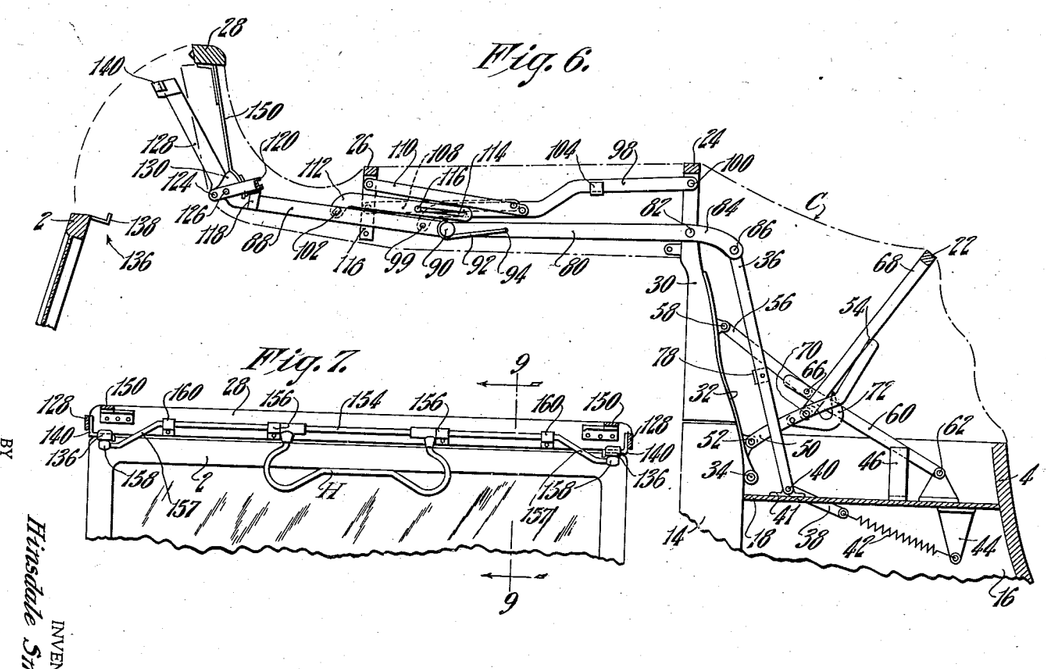
Fig. 6 is a view similar to Fig. 2 with certain parts of the frame structure shown in a different relation.
Fig. 7 is a vertical sectional elevational view on the line 7—7 of Fig. 2.

From the position shown in Fig. 6, bar members 88 are swung upwardly or clockwise relative to bars 80 and bars 80 are moved rearwardly to swing pillars 30 and links 36 clockwise to some position such as shown in Fig. 8.

In this position the bars 108 and 110 associated with the bow 26 are swung away from bar members 88 until the pins 116 of links 108 reach the ends of slots 144 of members 112. This positions bow 26 so that the forward header bow 28 may pass forwardly thereof. Continued movements of the parts consists in, swinging the members 88 clockwise and moving members 80 rearwardly to swing pillars 30 clockwise, the studs 102 bringing up against free ends 96 of springs 92. The parts finally come to rest in the fully collapsed relation shown in Fig. 12 wherein the stops 78 of links 75

36 rest on stops 46 and members 88 rest on the supports 104 of links 98. In this position the members 88 and the parts associated therewith are supported by supports 104.

When in collapsed position the back rest 10 of the seat is swung rearwardly so that the locking hooks 20 thereof engage the hooks 118 to releasably hold the parts in collapsed position. As the frame parts approach their collapsed position, the back 10 of the seat may be moved forward slightly so that when the parts are in their collapsed or nested position the parts 128, 150 and forward bow 28 are disposed behind the seat as shown in Fig. 12.

It will be noted when the frame parts are moved to collapsed position that the stud 102 engages the end 96 of the spring 92. This tensions the spring so that it tends to urge the link 88 upwardly away from link 80. The spring 42 is also tensioned more or less. This is very desirable because when it is desired to move the frame to extended position and as the seat is moved forwardly to release the locking devices, the springs assist in facilitating the easy and ready movement of the frame to its extended position.

It is an easy matter for one person to move the structure between collapsed and extended positions. A person may stand in the tonneau or any convenient place in the automobile to manipulate the frame. To move the frame to its extended position, the back of the seat is moved forwardly a slight distance to release the frame parts and the member 129 is grasped and swung upwardly and over. The springs 92 tend to cause the members 88 to swing relative to the members 80 while the springs 42 tend to move the rear part of the structure toward extended position. When the parts are moved approximately in the position shown in Fig. 6, the members 128 are swung downwardly to locate lock parts 140 on lock parts 136 and then the member 129 is swung forwardly or counterclockwise to bring the pivot 124 below pivot 126 locking parts 140 and 136 and simultaneously swinging forward header 28 down into final position whereupon the handle H is pulled downwardly to carry the rollers 158 beneath the locks 136.

While I have described the invention in great detail and with respect to a preferred form thereof, it is not desired to be limited thereto since many changes and modifications may be made therein without departing from the spirit and scope of the invention. What it is desired to claim and secure by Letters Patent of the United States is:

1. The combination in a vehicle of, a frame including a plurality of pivoted together members, certain of which are pivoted to the rear portion of said vehicle, whereby said members may be moved between collapsed position at the rear of said automobile and an extended position, locking means associated with certain of said members and the forward part of said automobile engageable when said members are in extended position, and swinging means to position said locking means forwardly of their point of engagement and then to move a part of the means rearwardly to engage said locking means.

2. The combination in a vehicle of, a plurality of pivoted together members, certain of which are pivoted to the rear portion of said vehicle whereby said members may be moved between collapsed relation at the rear of said automobile and an extended relation, supporting means adapted to be engaged by certain members when the members are in collapsed relation, supporting means associated with certain of said members against which other members abut whereby the latter are supported, locking means for said members when in collapsed relation and spring means urging the members against said locking means and into extended relation, the said locking means including a back rest movable on said vehicle between locking and non-locking position having a locking member overlying said frame when in collapsed relation.

3. The combination in a vehicle of, a body having a top support forwardly thereof, locking means associated therewith, a frame consisting of pivoted together members certain of the rearmost ones of which are pivoted to the rear part of said body, swinging end members having engaging means for engaging the said locking means, and connections between said end members and certain of the frame members adapted to facilitate forward and backward movements of said engaging means relative to the locking means and to bring them into locking engagement therewith.

4. The combination in a vehicle of a body having a top support forwardly thereof, locking members on said support, a frame including a plurality of pivoted together members, the endmost members thereof being provided with engageable members and pivotal connections between said endmost members and the next adjacent members permitting the former to swing forwardly to carry the engageable members beyond engagement with the locking means and then to move the same rearwardly to engage said members.

5. The combination in a vehicle of, a body having a forward support, a frame including endmost members and adjacent members, the endmost members and said support having engageable locking means, pivotal connections between said endmost members and the adjacent members including blocks to which adjacent ends of said members are separately pivoted whereby the said blocks and endmost member may swing forwardly relative to said adjacent members to position said engaging means for engagement and the blocks may be swung rearwardly to move the endmost members rearwardly for engagement of said means and means to swing said blocks.

6. The combination in a vehicle of, a body having a forward top support, a frame including endmost members and adjacent members and pivotal connections therebetween, the endmost members and said support having engageable locking means, the pivotal connections between said endmost members and the adjacent members including blocks to which adjacent ends of said members are pivoted whereby the endmost members may swing forwardly relative to said adjacent members to position said engaging means for engagement and the blocks may be swung to move the endmost members rearwardly for engagement of said means, and means carried by said blocks for swinging the same and supporting a forward bow whereby the said bow is positioned simultaneously with movement of said block.

7. The combination in a vehicle of, a body and a windshield forwardly thereof, a lock on said windshield, a frame including pivoted together members certain of which members are pivoted to said body at the rear portion thereof, certain forward members having locks at forward ends engageable with the first-named locks, connections associated with the rear ends of said last-named certain members and adjacent members of the frame arranged to permit said certain members to move forwardly of the adjacent members to position the locks thereon beyond locking engagement with the locks on the windshield and then to engage them, and members supporting a header associated with said connections movable into position over the windshield as the locks are brought into locking engagement.

8. The combination of a body and forward support of an automobile with a top construction comprising, a frame composed of members connected for relative movements between collapsed and extending positions and including forward members, a lock part on said support, the said forward members having a lock part to engage the lock part on said support, connections between said forward members and adjacent members of said frame including block members and pivotal connections between the rear ends of the forward members and block members and pivotal connections between the forward ends of the adjacent members and block members disposed to facilitate the first-named pivotal connection being swung forwardly relative to the second-named pivotal connections for positioning the lock part of the forward frame members beyond the lock part of the support and then rearwardly to engage said lock parts, and means to limit the swinging movements of the first-named pivotal connections rearwardly.

9. The combination of an automobile body and windshield with a top construction comprising, a frame including pivoted together members certain of which are pivoted to said body, forward members, engageable locks associated with the forward members and windshield, pivotal connections between the forward members and adjacent members of the frames disposed to permit the forward members to be swung forwardly of the adjacent members to position the engageable locks beyond their point of engagement and then rearwardly to engage them, members associated with said connections carrying a header bow, and locking means associated with said windshield and bow, all adapted and arranged whereby the forward members and header bow may be simultaneously positioned for locking to the windshield.

10. The combination of an automobile body and windshield with a top structure comprising, a frame including end members and adjacent members on each side of said body, a locking member on said windshield, a locking member engageable therewith on the forward end of said end member, blocks, pivotal connections between the forward ends of the adjacent members and blocks whereby said blocks may swing relative to the adjacent members, and pivotal connections between the blocks and rear ends of the end members, the said pivotal connections being arranged whereby the last-named connections may be swung to a position forwardly of the first-named connections whereby the end members are extended and the locking members may be positioned beyond their point of engagement and then swung rearwardly to retract the said end members and bring the locking members into locking engagement.

11. The combination of an automobile body and windshield with a top structure comprising, a frame including end members and adjacent members on each side of said body, a locking member on said wind-shield, a locking member engageable therewith on the forward end of said end member, blocks, pivotal connections between the forward ends of the adjacent members and blocks whereby said blocks may swing relative to the adjacent members, pivotal connections between the blocks and rear ends of the said members, the said pivotal connections being arranged whereby the last-named connections may be swung to a position forwardly of the first-named connections whereby the end members are extended and the locking members may be positioned beyond their point of engagement and then swung rearwardly to retract the said end members and bring the locking members into locking engagement, the adjacent ends of the end and adjacent members being provided with engaging parts which are engaged when the end members are in locking position whereby each end member and adjacent member are rigidly held.

12. The combination of an automobile body and windshield with a top structure comprising, a frame including end members and adjacent members on each side of said body, a locking member on said windshield, a locking member engageable therewith on the forward end of said end member, blocks, pivotal connections between the forward ends of the adjacent members and blocks whereby said blocks may swing relative to the adjacent members, pivotal connections between the blocks and rear ends of the end members, the said pivotal connections being arranged whereby the last-named connections may be swung to a position forwardly of the first-named connections whereby the end members are extended and the locking members may be positioned beyond their point of engagement and then swung rearwardly to retract the said end members and bring the locking members into locking engagement, and a transverse member connecting said blocks to bring about simultaneous swinging movements thereof.

13. The combination of an automobile body and windshield with a top structure comprising, a frame including end members and adjacent members on each side of said body, a locking member on said windshield, a locking member engageable therewith on the forward end of said end member, blocks, pivotal connections between the forward ends of the adjacent members and blocks whereby said blocks may swing relative to the adjacent members, pivotal connections between the blocks and rear ends of the end members, the said pivotal connections being arranged whereby the last-named connections may be swung to a position forwardly of the first-named connections whereby the end members are extended and the locking members may be positioned beyond their point of engagement and then swung rearwardly to retract the said end members and bring the locking members into locking engagement, and separate members extending from said blocks carrying on their ends a transverse bow adapted to lie adjacent said windshield, the said members disposed on said blocks to position said bow adjacent the windshield when the end members are in retracted position.

14. The combination of an automobile body and windshield with a top structure comprising, a frame including end members and adjacent members on each side of said body, a locking member on said windshield, a locking member engageable therewith on the forward end of said end member, blocks, pivotal connections between the forward ends of the adjacent members and blocks whereby said blocks may swing relative to the adjacent members, pivotal connections between the blocks and rear ends of the end members, the said pivotal connections being arranged whereby the last-named connections may be swung to a position forwardly of the first-named connections whereby the end members are extended and the locking members may be positioned beyond their point of engagement and then swung rearwardly to retract the said end members and bring the locking members into locking engagement, separate members extending from said blocks carrying on their ends a transverse bow adapted to lie adjacent said windshield, the said members disposed on said blocks to position said bow adjacent the windshield when the end members are in retracted position, and locking means associated with said bow and windshield for holding the bow in position adjacent thereto.

15. The combination of an automobile body and windshield with a top structure comprising, a frame including end members and adjacent members on each side of said body, a locking member on said windshield, a locking member engageable therewith on the forward end of said end member, blocks, pivotal connections between the forward ends of the adjacent members and blocks whereby said blocks may swing relative to the adjacent members, pivotal connections between the blocks and rear ends of the end members, the said pivotal connections being arranged whereby the last-named connections may be swung to a position forwardly of the first-named connections whereby the end members are extended and the locking members may be positioned beyond their point of engagement and then swung rearwardly to retract the said end members and bring the locking members into locking engagement, separate members extending from said blocks carrying on their ends a transverse bow adapted to lie adjacent said windshield, the said members disposed on said blocks to position said bow adjacent the windshield when the end members are in retracted position, locking means associated with said bow and windshield for holding the bow in position adjacent thereto, and a transverse member connecting said blocks whereby the said member, blocks, upper members and bow form a rectangular rigid frame.

16. The combination of an automobile body and windshield with a top structure comprising, a frame including end members and adjacent members on each side of said body, a locking member on said wind-shield, a locking member engageable therewith on the forward end of said end member, blocks, pivotal connections between the forward ends of the adjacent members and blocks whereby said blocks may swing relative to the adjacent members, pivotal connections between the blocks and rear ends of the end members, the said pivotal connections being arranged whereby the last-named connections may be swung to a position forwardly of the first-named connections whereby the end members are extended and the locking members may be positioned beyond their point of engagement and then swung rearwardly to retract the said end members and bring the locking members into locking engagement, a transverse member connecting said blocks to bring about simultaneous swinging movements thereof, side members extending from said blocks adapted to lie adjacent the end members, a transverse bow member carried thereby, and a transverse member carried by said blocks, the said transverse member, side members and blocks forming a rigid rectangular frame.

17. The combination of an automobile body and windshield with a top structure comprising, a frame including end members and adjacent members on each side of said body, a locking member on said wind-shield, a locking member engageable therewith on the forward end of said end member, blocks, pivotal connections between the forward ends of the adjacent members and blocks whereby said blocks may swing relative to the adjacent members, pivotal connections between the blocks and rear ends of the end members, the said pivotal connections being arranged whereby the last-named connections may be swung to a position forwardly of the first-named connections whereby the end members are extended and the locking members may be positioned beyond their point of engagement and then swung rearwardly to retract the said end members and bring the locking members into locking engagement, a transverse member connecting said blocks to bring about simultaneous swinging movements thereof, side members extending from said blocks adapted to lie adjacent the end members, a transverse bow member carried thereby, a transverse member carried by said blocks, the said transverse member, side members and blocks forming a rigid rectangular frame, and locking means on the transverse bow for securing to the windshield whereby the rigid frame may be secured thereto.

HINSDALE SMITH.